United States Patent Office 3,449,219
Patented June 10, 1969

3,449,219
PROCESS FOR FRACTIONATING PROPYLENE FROM PROPYLENE OXIDE IN THE PRESENCE OF HYDROCARBON FLUX
John P. Schmidt, New York, N.Y., assignor to Halcon International, Inc., a corporation of Delaware
No Drawing. Filed Oct. 3, 1966, Ser. No. 583,977
Int. Cl. B01d 3/34
U.S. Cl. 203—68     7 Claims

ABSTRACT OF THE DISCLOSURE

This invention relates to a process for separating propylene oxide and t-butyl alcohol, obtained from the reaction of propylene and t-butyl hydroperoxide, by fractionating the reaction mixture at pressures of from about 100 p.s.i.a. to about 470 p.s.i.a. while maintaining a bottoms temperature below about 140° C. and while maintaining in the bottoms a hydrocarbon flux material.

---

The present invention relates to propylene oxide. More particularly, it relates to an improved process for the co-production of propylene oxide and t-butyl alcohol.

Known processes for the co-production of t-butyl alcohol and propylene oxide involve reacting t-butyl hydroperoxide and propylene. The t-butyl hydroperoxide, produced by oxidizing isobutane, is separated from unreacted isobutane before being reacted with propylene in the presence of a catalyst to form t-butyl alcohol and propylene oxide. The epoxidation reactor effluent is fractionated to separate unreacted propylene and propane. This fractionation is generally carried out at elevated pressure, e.g., about 250 p.s.i.a., to permit the use of cooling water for condensation. At this pressure the column bottoms, which normally comprise propylene oxide and t-butyl alcohol with small amounts of other components formed in the oxidation and epoxidation, boil at a high temperature, above 150° C. Fractionation at this temperature results in decomposition of significant amounts of propylene oxide.

It is an object of the present invention to provide an improved method for the co-production of propylene oxide and t-butyl alcohol. Another object is to provide a method for recovering unreacted propylene and propane from the epoxidation reactor effluent in a process for the co-production of propylene oxide and t-butyl alcohol. A further object is to permit the separation of the epoxidation reactor effluent at lower temperatures. Still another object is to minimize the decomposition of propylene oxide. These and other objects of the present invention will become apparent from the following description:

It has now been found that the objects of the present invention are achieved by separating propylene oxide and t-butyl alcohol from a mixture resulting from reacting propylene and t-butyl hydroperoxide which comprises fractionating the mixture at pressures of from about 100 p.s.i.a. to about 470 p.s.i.a. and at a bottoms temperature below about 140° C. while maintaining in the bottoms a substantial quantity, up to about 25% by weight, of a flux material. The flux material is a hydrocarbon having a boiling point of from about 70° C. to about 120° C. at elevated pressure of 250 p.s.i.a. The hydrocarbon may be aliphatic or cycloaliphatic, straight-chain or branched, saturated or unsaturated. The fractionation is carried out under such conditions that the flux material is removed with the bottoms while substantially all of the unreacted propylene and propane is removed with the distillate. Preferably the flux material is isobutane. Other suitable materials, however, such as normal butane or mixtures of n-butane and isobutane can also be used. Examples of other suitable materials are cyclopropane and cyclobutane.

Preferably, from about 5% to about 25% by weight of the flux material is present in the fractionator bottoms during the separation step. The flux material may be added separately in the separation step by being fed directly to the fractionator or the flux material may already be present in the epoxidation reactor effluent as it is fed to the fractionator. According to a preferred method of carrying out the present invention, the epoxidation of propylene by t-butyl hydroperoxide is carried out in the presence of the flux material. This procedure is contrary to the practice of the art which is to remove unreacted isobutane from t-butyl hydroperoxide before feeding the latter material to the epoxidation reactor. One reason for this practice is that the presence of a flux material slows the reaction rate and tends to increase pressure in the epoxidation reactor. In contrast to this prior practice, however, it has been found that permitting at least some unreacted isobutane to remain in the t-butyl hydroperoxide eliminates the step of separating unreacted isobutane from t-butyl hydroperoxide or minimizes the degree of separation required as well as providing substantial benefits in the subsequent separation of desired products from the epoxidation reactor effluent.

The epoxidation reactor effluent is fractionated under such conditions that substantially all of the unreacted propylene and propane are taken overhead and condensed with substantially no decomposition of propylene oxide in the fractionation column. In order to condense the column overhead gases with common industrial coolants such as air or water, the fractionation pressure should be between 100 p.s.i.a. and 470 p.s.i.a., and preferably between 220 p.s.i.a. and 320 p.s.i.a. The bottoms temperature should not exceed that temperature at which a significant portion of the propylene oxide will decompose, usually from about 110° C. to about 140° C., depending upon the specific composition of the material being fractionated. With the fractionation column pressure fixed by the temperature of the available cooling medium, the temperature at the bottom of the column can be controlled by the amount of flux material present, steps being taken to ensure that the amount is sufficient to prevent the temperaure from exceeding the decomposition temperature.

According to a preferred embodiment of the invention, isobutane is oxidized by known methods to yield t-butyl hydroperoxide and t-butanol. The isobutane oxidation reactor effluent is flashed or distilled to remove at least some unreacted isobutane and to reduce the isobutane level to from about 5 wt. percent to about 30 wt. percent isobutane in the liquid isobutane oxidation products. The oxidation products comprise t-butyl hydroperoxide, t-butyl alcohol, and other substances produced by the reaction of isobutane with oxygen. The isobutane-containing t-butyl hydroperovide is then reacted catalytically withp ropylene in liquid phase at conditions such that from about 95% to about 100% of the t-butyl hydroperoxide charged is converted. The epoxidation reactor effluent is then distilled at from about 220 p.s.i.a. to about 320 p.s.i.a. to remove unreacted propylene and propane in the overhead stream, and to obtain a bottoms stream comprising isobutane, propylene oxide, t-butyl alcohol, and other products of the oxidation and epoxidation reactions. The isobutane concentration is maintained such that the temperature at the bottom of the fractionating column is below about 140° C. The loss of propylene oxide by decomposition in the fractionating column is less than 1%.

In addition to the quantity of isobutane or other flux material that is present in the epoxidation reactor effluent, additional portions of isobutane or other flux material may also be fed to the fractionating column as necessary, for improved control of the bottoms temperature.

The rate of decomposition of propylene oxide in the fractionation column bottoms stream increases with increasing temperature and also with increasing concentration of t-butyl hydroperoxide. Therefore, the requisite amount of flux material depends on the degree of conversion of t-butyl hydroperoxide in the epoxidation reactor, as well as on the boiling point of the flux material and on the pressure in the fractionation column.

The following examples illustrate the present invention without, however, limiting the same thereto.

EXAMPLE 1

Isobutane is oxidized to t-butyl hydroperoxide under known conditions, and the oxidation effluent is flashed to reduce the isobutane concentration to 9 wt. percent. The resulting solution of t-butyl hydroperoxide is epoxidized with an excess of propylene in the presence of a catalyst under conditions such that more than 98% of the t-butyl hydroperoxide is converted. The epoxidation reactor effluent is fractionated at 240 p.s.i.a. to remove substantially all of the unreacted propylene as an overhead stream, with substantially all of the isobutane remaining in the bottoms. The concentration of t-butyl hydroperoxide in the column bottoms stream is less than 1 wt. percent. The column bottoms temperature is about 130° C. The rate of decomposition of propylene oxide in the column bottoms is only about 2% per hour. The concentration of isobutane in the column bottoms stream is about 6 wt. percent. In the absence of any isobutane in the column bottoms stream, the bottoms temperature would be about 150° C., and the propylene oxide decomposition rate would exceed 7% per hour.

EXAMPLE 2

The epoxidation reactor effluent is the same as in Example 1. The effluent is fractionated at 300 p.s.i.a. to remove substantially all of the propylene as an overhead stream. In addition to the isobutane entering the column with the epoxidation reactor effluent, sufficient additional isobutane is fed to the column to maintain a bottoms temperature of 130° C. The required isobutane concentration in the column bottoms is 16 wt. percent. The rate of decomposition of propylene oxide in the column bottoms is only about 2% per hour. In the absence of any isobutane in the column bottoms stream, the bottoms temperature would be above 160° C., and the propylene oxide decomposition rate in the bottoms would exceed 12% per hour.

EXAMPLE 3

The isobutane oxidation and flash are caried out as in Example 1. The resulting solution of t-butyl hydroperoxide is epoxidized with an excess of propylene in the presence of a catalyst under conditions such that about 90% of the t-butyl hydroperoxide is converted. The epoxidation reactor effluent is fractionated at 240 p.s.i.a. to remove substantially all of the propylene as an overhead stream. Sufficient additional isobutane is fed to the column to maintain a bottoms temperature of 110° C. The required isobutane concentration in the column bottoms is about 20 wt. percent. The concentration of t-butyl hydroperoxide in the column bottoms is 4 wt. percent. The rate of decomposition of propylene oxide in the column bottoms is only about 2% per hour. In the absence of any isobutane in the column bottoms stream, the bottoms temperature at 240 p.s.i.a. would be about 150° C., and the propylene oxide decomposition rate would exceed 50% per hour.

What is claimed is:

1. A process for separating propylene oxide and t-butyl alcohol from a mixture resulting from reacting propylene and t-butyl hydroperoxide which comprises fractionating the mixture at a pressure of from about 100 p.s.i.a. to about 470 p.s.i.a. and at a bottoms temperature below about 140° C. while maintaining in the bottoms from about 5 to about 25% by weight of a hydrocarbon flux material having a boiling point of from about 70° C. to about 120° C. at a pressure of 250 p.s.i.a., and removing unreacted propylene overhead.

2. A process according to claim 1 wherein the pressure is from about 220 p.s.i.a. to about 320 p.s.i.a.

3. A process according to claim 1 wherein the heating takes place at temperatures of from about 110° C. to about 140° C.

4. A process according to claim 1 wherein the flux material is a member selected from the group consisting of isobutane, n-butane and mixtures thereof.

5. A process according to claim 2 wherein heating takes place at temperatures of from about 110° C. to about 140° C.

6. A process according to claim 5 wherein the flux material is a member selected from the group consisting of isobutane, n-butane and mixtures thereof.

7. A process according to claim 1 wherein the epoxidation reaction is carried out in the presence of the flux material.

References Cited

UNITED STATES PATENTS 3,351,635   11/1967   Kollar _____ 260—348.5

HENRY R. JILES, *Primary Examiner.*

S. WINTERS, *Assistant Examiner.*

U.S. Cl. X.R.

203—70, 91; 260—348.5